Patented Aug. 21, 1928.

1,681,702

UNITED STATES PATENT OFFICE.

FRIEDRICH JOST, OF SODINGEN, GERMANY, ASSIGNOR TO KARL MÜLLER, OF BERLIN-LICHTERFELDE-WEST, GERMANY.

METHOD FOR PURIFYING GASES.

No Drawing. Application filed November 8, 1926, Serial No. 147,190, and in Germany November 12, 1925.

The invention relates to a method for purifying gases; its object being to cleanse the gases, already preliminarily freed from foreign substances, from the very small impurities still contained therein. In the gases commonly employed for the synthesis of ammonia such impurities consist in oxygen, steam or water, carbon monoxide, carbon dioxide and sulphurous gaseous components. The aim of the present invention therefore is to remove even the smallest amounts of such impurities from the gases preliminarily purified by milk of lime or by caustic alkalies. This final purification is of extraordinary importance and consideration for executing the synthesis of ammonia.

Catalysts for the synthesis of ammonia have been proposed; such catalysts are effective at relatively low temperatures and pressures, so that high concentrations of ammonia will result. But in consequence of the great sensibility with regard to very small quantities of impurities contained in the gases destined for the synthesis of ammonia, such catalysts could not be used commercially. The smallest amounts of impurities diminish the efficiency; the catalysts soon decrease in their action. Therefore a novel method was still necessary for removing the last impurities still contained in the gases by special means. Impurities damaging the catalysis are for instance oxygen, steam or water, gaseous sulphuric compounds, carbon monoxide, carbon dioxide and similar substances.

Now it has been found by trials, that the impurities in question even if contained in the gases in smallest quantities, may be removed without any residue by means of alkali metal hydrides of which the most economic is the hydride of sodium, when the gases to be treated are passed over the said substances at nearly 200 centigrade. The gases with their impurities are preferably brought into contact with the catalyst under pressure.

The employment of pressure is important because at temperatures over 200° C., sodium hydride decomposes into metal and free hydrogen. The amount of decomposition will depend to a considerable extent on the amounts of hydrogen in the gases. At high pressure, the decomposition of the sodium hydride is prevented, since the equilibrium is displaced in the direction of the formation of sodium hydride.

For the purpose of executing the present method in a technical and economical manner only the remaining amounts of impurities are eliminated, which as above stated cannot be completely removed by any other means; the greatest part of the impurities is removed before by the well known means, as for instance milk of lime and caustic alkalies; the remaining amounts which cannot be removed by these means are then absorbed by the hydride of sodium.

The alkali metal hydrides have the property that they will react with all above mentioned impurities as oxygen, sulphuric-compounds, carbon monoxide, carbon dioxide so that the latter are removed in one operation if care is taken, that the alkali metal hydrides for the purpose of increasing their activity are heated to temperatures of 200 centigrade and thereabout and if at the same time pressure is applied.

Further it has been found, that the hydrides, especially the hydride of sodium as obtained in technical state is likewise applicable for the purification. Such hydrides still contain small quantities of sodium-oxygen compounds, and partially sodium-nitrogen compounds also. The alkali metal hydrides may be mixed with inorganic carrier substances, especially with metals, so that the alkali metal hydrides are suitably distributed and cover a great surface, so that they will serve very well. In all these modifications of the present method the purification of the gases is rendered easier and more rapid, if the gases are treated under pressure.

I claim:

1. A process of freeing gases from small amounts of oxygen, water vapor, carbon monoxide, carbon dioxide and sulphurous gases, which comprises contacting said gas to be purified with alkali metal hydride.

2. A process of freeing gases from small amounts of oxygen, water vapor, carbon monoxide, carbon dioxide and sulphurous gases, which comprises contacting said gas to be purified with sodium hydride.

3. A process of freeing gases from small amounts of oxygen, water vapor, carbon monoxide, carbon dioxide and sulphurous gases, which comprises contacting said gas to be purified with alkali metal hydrides at a temperature of about 200° C.

4. A process of freeing gases from small amounts of oxygen, water vapor, carbon monoxide, carbon dioxide and sulphurous gases, which comprises contacting said gas to be purified with sodium hydride at a temperature of about 200° C.

5. A process of freeing gases from small amounts of oxygen, water vapor, carbon monoxide, carbon dioxide and sulphurous gases, which comprises contacting said gas to be purified with alkali metal hydrides at a temperature of about 200° C. and under pressure.

6. A process of freeing gases from small amounts of oxygen, water vapor, carbon monoxide, carbon dioxide and sulphurous gases, which comprises contacting said gas to be purified with sodium hydride at a temperature of about 200° C. and under pressure.

7. A process of freeing gases from small amounts of oxygen, water vapor, carbon monoxide, carbon dioxide and sulphurous gases, which comprises contacting said gas to be purified with alkali metal hydride disposed on a carrier.

Dated this 26th day of October, 1926.

FRIEDRICH JOST.